Dec. 27, 1955  E. MATTILL ET AL  2,728,369
CLOSURE FRAME FOR A HAND-BAG
Filed June 11, 1952  4 Sheets-Sheet 1

Inventors
EUGEN MATTILL
GEORG REITZEL
By Frederick E. Hane
ATTORNEY

Dec. 27, 1955  E. MATTILL ET AL  2,728,369
CLOSURE FRAME FOR A HAND-BAG
Filed June 11, 1952  4 Sheets-Sheet 2
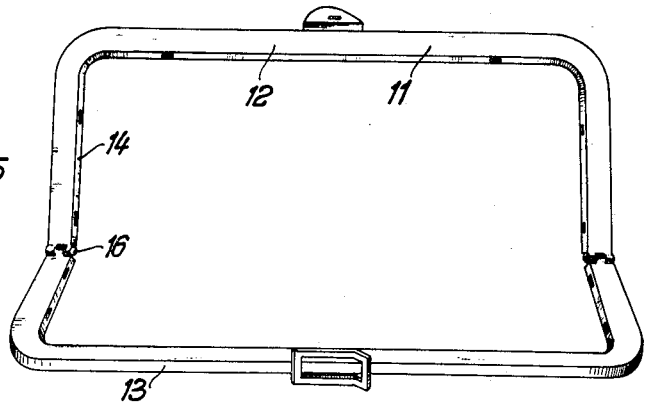
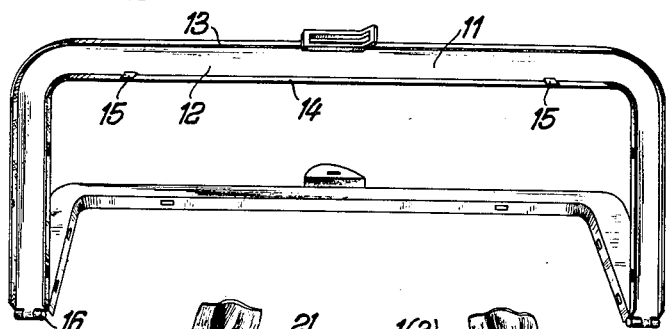
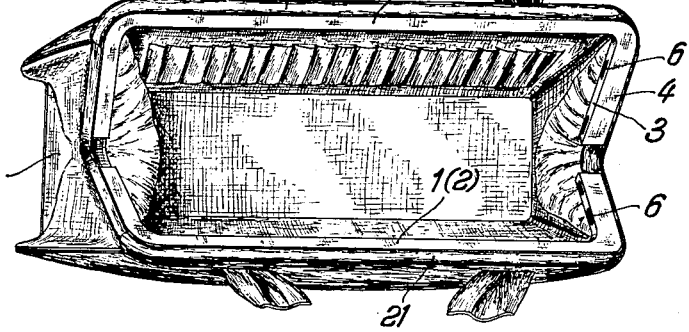
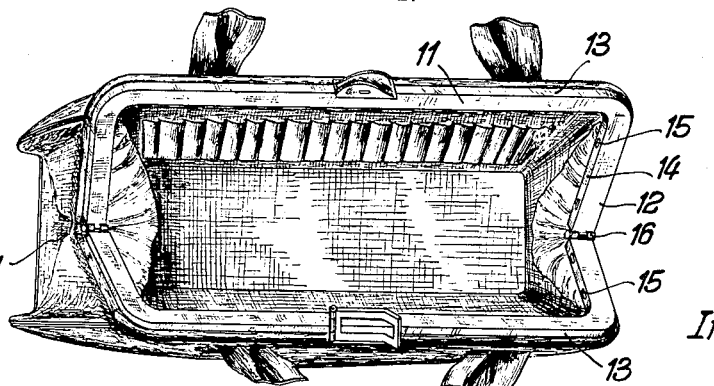
Inventors
EUGEN MATTILL
GEORG REITZEL
By Fredrich E. Hane
ATTORNEY Dec. 27, 1955  E. MATTILL ET AL  2,728,369
CLOSURE FRAME FOR A HAND-BAG
Filed June 11, 1952  4 Sheets-Sheet 4

Inventors
EUGEN MATTILL
GEORG REITZEL
By *Friedrich E. Hary*
ATTORNEY

United States Patent Office 2,728,369
Patented Dec. 27, 1955

2,728,369

CLOSURE FRAME FOR A HAND-BAG

Eugen Mattill, Stockholm, Sweden, and Georg Reitzel, Gelnhausen, Germany

Application June 11, 1952, Serial No. 292,786

Claims priority, application Sweden June 18, 1951

3 Claims. (Cl. 150—45)

This invention relates to a closure frame for receptacles, and more particularly for ladies' hand bags made of leather, textiles or plastics for example, and in which the material of the bag is attached to a rigid inner frame which in turn is secured to a corresponding outer frame. However, the invention may also be applied to receptacles made of hard material as for instance in vanity cases, cigarette cases and others, without any limitation as to shape or size of the container or receptacle.

One purpose of the invention is the elimination of certain disadvantages in connection with closure frames as at present in use, and the avoidance of certain difficulties inherent in the present methods of attaching the frames to the receptacles. The invention, therefore, consists in the provision of a closure of the said type which is of simple construction, cheap to produce and convenient to manipulate, and which results in a strong connection of the parts of the frame without the application of tools and without the employment of skilled labor therefor. As a result the closure frame of the invention is suitable for mass production of such receptacles, the application of the outer frame preferably constituting the last step in the operation.

Up to the present the methods used for attaching soft material to the frames of the aforesaid kind require very extensively, if not exclusively, the employment of hand work and a considerable number of working steps, which makes the fitting of the frames to the bags, or vice versa, inconvenient, time consuming, and costly. In addition there has always been the risk of the finished work being marred or suffering in appearance for instance by being soiled with adhesive or damaged by the working tools, or the frame itself may become scratched or otherwise damaged. It has been the practice, therefore, after the article was finished, to give the frame a last polish, which requires another operation.

All these numerous operations and the necessity of employing particularly skilled persons for this work, added considerably to the costs, and the cumbersome manipulations constituted a great obstacle to mass production.

The invention also is an improvement on closure frames which have become known in the art as "inverted frames" and in which clips are used for attaching the material to the frame. Frame designs of this kind are practical for square frames only. They do not lend themselves to other shapes and, when applied to other shapes, the appearance of the finished article is usually unsatisfactory. With the invention no failures of this kind need to be expected, as the improved closure frame is adaptable to practically all shapes and cross sections which may be desired to suit taste or convenience, including such which prior to this invention could not be used.

In accordance with the invention the frame is divided into several parts as, in itself, is known, namely into an inner and an outer frame, whereby the inner frame is connected to the material of the bag while the outer frame remains visible in the finished article. The method of fitting, in accordance with the invention, is such that it is only necessary to press the inner frame with the material applied thereto into the outer frame preferably by hand and to thus connect the two frames without the use of a tool.

The invention, by the aforedescribed method, enables the fitting of the outer frames to be performed by unskilled persons as the last operational step, whereas the application of the material of the bag to the inner frames may be performed at any convenient intermediate stage.

With the aforesaid and other objects in view the invention mainly consists in the provision of a closure frame which is composed of an inner and an outer frame member of preferably C-section, and in which the outer frame is provided on its inside with suitably formed projections adapted to spring into corresponding recesses on the inner frame. The frames in accordance with the invention may be of any shape or cross section, so there is practically no limitation to the extent of shape or taste in the production of bags.

The accompanying drawings diagrammatically illustrate several embodiments of the invention by way of example, it being understood that the invention is not intended to be limited to these showings but that various modifications may be devised to suit taste or requirements, all within the scope and the meaning of the claims appended at the end of this specification. In the drawings:

Fig. 5 is a perspective view of an outer frame for use in ladies' hand bags.

Fig. 6 represents the frame according to Fig. 5 as seen from below.

Fig. 7 shows a lady's hand bag in a view from above after attachment of the inner frame.

Fig. 8 is a similar view with the outer frame applied.

Figure 15:
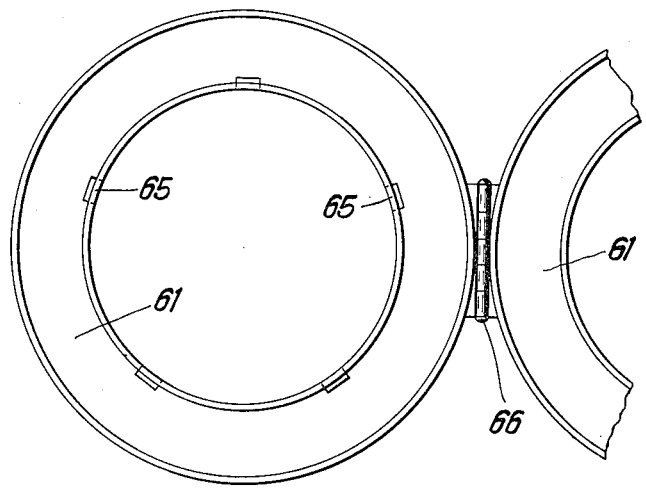
Fig. 15 illustrates the application of the invention to a case, such as a vanity case for example.

Figs. 16, 17, 18, and 19 represent longitudinal sections through a container such as shown in Fig. 15 with various formations of the inner and outer frames respectively.

Referring to Figs. 1 to 4 in particular, the inner frame for use in a lady's hand bag consists of a yoke 1, or 2 respectively, of U, V, L or other cross section, and U-shaped as seen from above as would correspond to the complete shape of the yoke. Each inner frame 1 or 2 has a narrow base branch 3 and comparatively long side flanges 4, 5 of which the flange 4 is preferably somewhat longer than the flange 5, as it will later be positioned on the outside of the outer frame when enclosed therein. Slots 6 are provided in the base branch 3 of the inner frame for a purpose still to be explained.

As seen in the arrangement shown in Figs. 5 and 6 the shape of the outer frame 11 corresponds to that of the inner frame 1, or 2 respectively. The said outer frame is C-shaped in cross section; it has a broad base branch 12 and short, outwardly directed parallel flanges 13, 14. Resilient noses, lugs, or projections 15 are provided on the inside of the inner flange 14 which are arranged to cooperate with the slots 6 of the inner frame 1, or 2 respectively.

Figure 9:
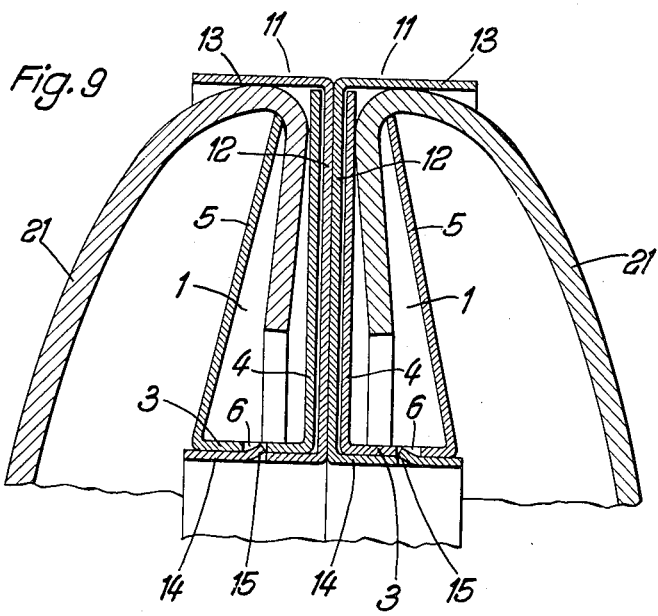
Fig. 9 is a cross section, on an enlarged scale, through the closed frame of a bag.
Figures 10, 11:
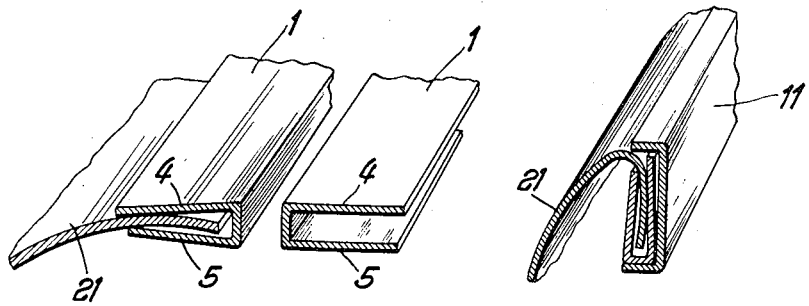
Figs. 10 and 11 are details shown in perspective.

The manner in which the parts cooperate with each other is shown in Figs. 9 to 11. First of all the rim of the material 21 is connected to the inner frame 1 by the flanges 4, 5 by the same being pressed out of their parallel position as shown in Fig. 10, right hand side, into a mutually converging position as indicated on the left hand side of that figure. Adhesive may be applied if thought advisable or, as an alternative, the material may be attached to the frame in any other way as by pasting for example.

Thereupon the inner frame together with the material applied thereto is pressed into the outer frame as shown in Fig. 11. As a result, the noses or projections 15 of the outer frame 11 spring into their corresponding slots 6 of the inner frame, thus making the connection between the two frames practically inseparable. It will be noted that, in the example described, the material 21 is held by the inner frame 1 only. When pulled outwardly so that the flange 5 would tend to move outwardly, the inner frame will encounter resistance to such movement by the material 21 becoming wedged between the edge of the flange 5 and the flange 13 of the outer frame 11.

The method of fitting the frame to a lady's hand bag is illustrated in Figs. 7 and 8. According to Fig. 7 the inner frame members 1 together with the material 21 are connected to the bag 31 in the manner indicated in Fig. 10 left hand side. The base branch 3 and the flanges 4 of the two inner frame members 1, or 2 respectively, are visible, as are also the slots 6 in the branches 3. In a lady's hand bag two inner frames are required which, however, prior to the attachment of the outer frame are not in connection with each other except that the material 21 holds them together at the place where later on the hinges 16 of the outer frame will take their position.

After the outer frame 11 has been attached as shown by the Figs. 9 to 11, the work piece has the appearance shown in Fig. 8. The inner frames are completely concealed from sight and only the outer frame 11 with its broad base branch 12 and its short flanges 13 and 14 remains visible. When the resilient projections 15 have been pressed out of the material of the flange 14, they will be visible thereon as small indentations as indicated in the figure.

Figure 1:
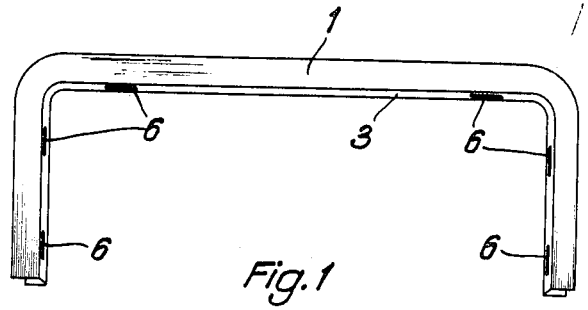
Figs. 1 and 2 illustrate an inner frame in accordance with the invention in a perspective view and in side elevation respectively.
Figure 2:
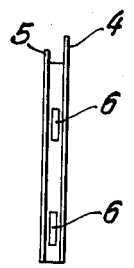
Figure 3:
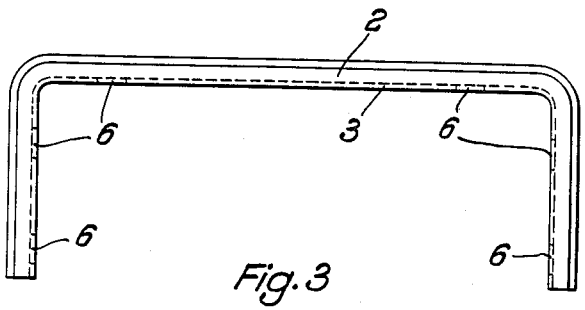
Figs. 3 and 4 illustrate a modified form of the inner frame in plan view and side elevation respectively.
Figure 4:
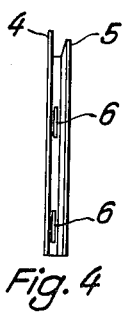
Figure 12:
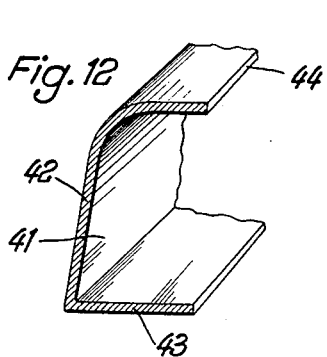
Figs. 12 and 13 are modified forms of the inner and outer frames in perspective cross sectional representations.
Figure 13:
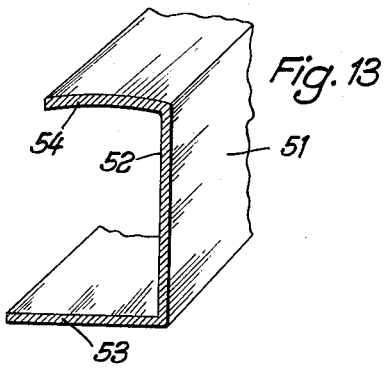
Figure 14:
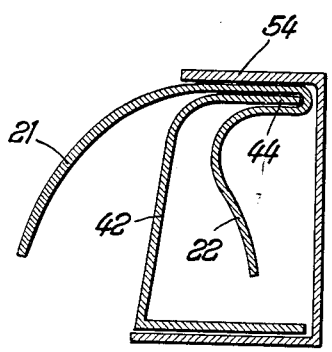
Fig. 14 is a cross section through an assembled frame in accordance with Figs. 12 and 13.

In Figs. 12 to 14 a modified form of the frames is shown. The inner frame 41, in this case, is C-shaped in cross section and provided with a broad base branch 42 and broad, parallel flanges 43, 44, the latter being shaped so as to produce a rounded edge with the base 42.

The profile of the outer frame 51 corresponds to the inner frame section and is provided with broad, parallel flanges 53 and 54. The outer flange, as indicated in Fig. 13, may be slightly bulged or curved. If both flanges 44 and 54 of the inner and outer frames are similarly curved, they nest one over the other when the inner frame 41 is being pressed into the outer frame.

The arrangement after its assembly is diagrammatically shown in Fig. 14 in connection with flat flanged frames. The material 21 has been folded over the outer flange 44 prior to the inner frame 41 being pressed into the outer frame 51. If desired, the free end 22 of the material 21 may be connected to the base 42 for instance by adhesive.

It is to be understood that the resilient projections and corresponding slots are arranged on the flanges 43 of the inner frames 41 and on the flanges 53 of the outer frame 52 respectively, but for the sake of simplicity, have been omitted in the figure. The said slots and projections may, however, be omitted if the flanges are curved in the manner aforesaid.

In the heretofore described figures the invention is shown as being applied to a lady's hand bag 31. However, the invention is not limited to hand bags or the like articles, but may be used on any kind of container or receptacle of whatever material desired, such as plastics, textiles, and the like.

The modifications shown in Figs. 15 to 19 illustrate further possible applications of the invention in connection, for example, with a receptacle of hard material, such as a vanity case or the like. In these modifications the outer frame 61 together with the inner frame form a configuration, such as a circle for instance, or any other square, oblong, or polygonal configuration desired. In its cross section the outer frame 61 is of a similar design as the outer frame 11 described in the foregoing embodiments of the invention, in that it is provided with a broad base branch 62 and short, parallel flanges 63, 64. Resilient noses, lugs, or projections are provided on the inside of the short flange 64.

Figure 16:
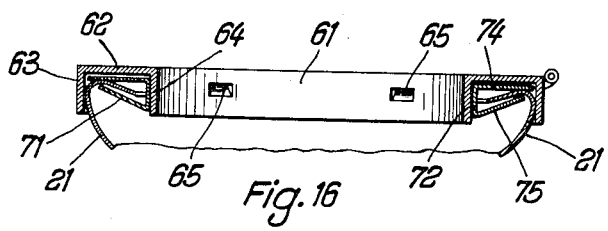

In the embodiment of the invention which is illustrated in Fig. 16 the inner frame is of the same or similar cross section as that of the inner frame 1 in Figs. 1, 2 and 9 to 11. It has a narrow base branch 72 and long flanges 74, 75, between which the material 21 is clamped or otherwise fixed. The inner frame 71 is also provided with slots spaced along its base 72 for the reception of the resilient projections 65.

Figure 17:
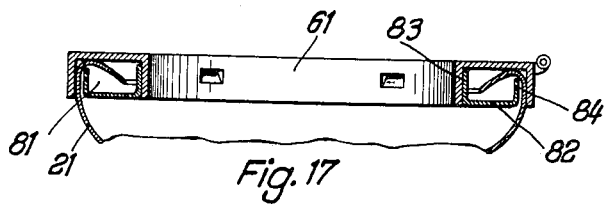

In the modification illustrated in Fig. 17 the outer frame is of a shape similar to that shown in Fig. 16, whereas the inner frame 81 resembles the shape of the frame shown in Figs. 12 to 14, having a broad base branch 82 and broad, parallel flanges 83, 84. The material 21, in this case, is attached in the same manner as indicated in Fig. 14.

Figure 18:
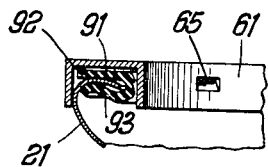

Fig. 18 shows the outer frame 61 unaltered, whereas the inner frame 91 is shown to be made of synthetic material. One of the flanges of the inner frame is in the shape of an S biased toward the other flange which is flat, for clamping the material against the flat flange. At its inner margin the inner frame 91 is provided with recesses corresponding to the afore described slots 6 for the reception of the projections 65 of the outer frame 61.

Figure 19:
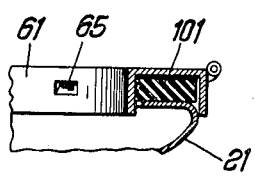

In Fig. 19 the inner frame 101 is shown to be substantially rectangular in cross section and is preferably made of synthetic material. On the side which, in the finished article, will be the outside, the material 21 is fastened preferably by being welded thereto. Along its inside face the inner frame 101 is also provided with recesses corresponding to the slots 6 for the reception of the resilient projections 65 of the outer frame 61.

The lid of the case may also consist of a frame 61 with an inner frame of any desired shape and material. It is connected to the other frame by means of a hinge 66.

From the foregoing it is apparent that the basic idea of the invention resides in providing three separate components namely, the cover material, the inner frame, and the outer frame, and in joining said components. When producing a bag in accordance with the invention, it is practical to proceed as follows: An unskilled person first takes single inner frames from the stack and connects them to the correspondingly cut edges of the material. This work may be facilitated by the use of a tool for pressing the flanges of the inner frames together or, if desired, it can be performed in a press provided for the purpose. It is to be noted that, although this work may well be carried out by hand, the use of a tool or a press can do no harm as the inner frame will not be visible in the finished bag. This step, therefore, does not require particular neatness.

After the inner frames 1 and 2 have been fitted to the corresponding sides of the bag as indicated in Fig. 7, the outer frames are applied. This is accomplished by pressing first the one inner frame into the respective outer frame half, and then the other. A slight hand pressure, for example by the thumb against the back of the outer frame until the projections 15 snap into their slots 6 is all the force normally required. This connection is practically inseparable, and no cord or adhesive is necessary to connect the inner and the outer frames to each other. Having proceeded in the way indicated the bag is finished, whereby the main part of the closing frame, namely the outer frame, has been fitted as the last step in production. The finished article has the appearance shown in Fig. 8.

As has been pointed out already, the invention is not intended to be limited to the parts shown and described. Changes may be resorted to in order to meet various requirements. The arrangement of the slots and projections, for instance, may differ, and they may be reversed in position in that the slots are provided in the outer frame while the projections will then have to be on the inner frame.

The cross section of the outer frame need not necessarily correspond to that of the inner frame. In fact, the outer frame may have an altogether different profile externally, as long as the inner profile corresponds to the outer profile of the inner frame, which may be the case, for instance, when it is desired to use outer frames of tubular outside appearance.

Although it may be desirable, generally, to produce the inner and outer frames of metal, the invention also affords the possibility of making one or both these frames of a different, particularly synthetic material which, with the employment of plastics as bag material, affords the advantage of connecting the inner frames by the application of a welding process thereto.

What we claim and desire to secure by Letters Patent of the United States is:

1. A closure frame for a receptacle, comprising a generally U-shaped, single piece outer frame of generally C-shaped cross-section, one of the depending cross-sectional flanges of the outer frame defining the inner outline of the closure frame and the other the outer outline thereof, the said inner flange having at least one inwardly extending yieldable protrusion, and a generally U-shaped, single piece inner frame of generally U-shaped cross-section, the said inner frame being fittable in the outer frame, the base branch of the inner frame resting upon the inner depending flange of the outer frame, the width of said base branch being slightly less than the width of said inner flange, and one of the flanges of the inner frame abutting against the base branch of the outer frame, the base branch of the inner frame having an opening therethrough permanently interlocking with said yieldable protrusion when the inner frame is fitted in the outer frame, the said abutting flange of the inner frame being approximately equal in length with the inner width of the base branch of the outer frame and the other flange of the inner frame being slightly shorter than said inner width so as to form a narrow gap between the end of the said other flange of the inner frame and the outer flange of the outer frame.

2. In a handbag, a closure frame comprising a substantially U-shaped, single piece outer flange of generally C-shaped cross-section, one of the depending cross-sectional flanges of the outer frame defining the inner outline of the closure frame and the other flange the outer outline thereof, the said inner flange having at least one inwardly extending yieldable protrusion, and a substantially U-shaped, single piece inner frame of generally U-shaped cross-section, the said inner frame being nested in the outer frame with its base branch abutting against the inner depending flange and with one of its flanges abutting against the base branch of the outer frame, the width of said base branch of the inner frame being slightly less than said inner flange of the outer frame, the base branch of the inner frame having an opening therethrough engaged by said protrusion thereby permanently latching together the two frames, the said abutting flange of the inner frame being approximately equal in length with the inner width of the base branch of the outer frame and the other flange of the inner frame being slightly shorter than the said inner width for forming a narrow gap between the outer end of the said flange of the inner frame and the outer flange of the outer frame, and pliable bag covering material extending through said gap into the space defined by the flanges and the base branch of the inner frame and retained therein by engagement with the outer flange of the outer frame and the end of the respective flange of the inner frame.

3. A handbag according to claim 2, wherein the flange of the inner frame forming said gap is bent toward the other flange of the said frame and against said covering material for further securing the said material in said space.

References Cited in the file of this patent

UNITED STATES PATENTS

| | | |
|---|---|---|
| 1,915,314 | Hiering | June 27, 1933 |
| 1,980,684 | Hiering | Nov. 13, 1934 |
| 2,004,220 | Sachs | June 11, 1935 |
| 2,045,649 | Hiering | June 30, 1936 |
| 2,053,082 | Hiering | Sept. 1, 1936 |
| 2,218,665 | Tamoschat | Oct. 22, 1940 |